July 9, 1968
E. B. RIETZ ET AL
3,392,248
INTERRUPTER STRUCTURE HAVING CONTOURED ARC SPLITTER
PLATES AND SEPARATELY HOUSED RESISTOR CONTACTS
AND RESISTOR STRUCTURE THEREFOR
Filed March 12, 1965
7 Sheets-Sheet 1
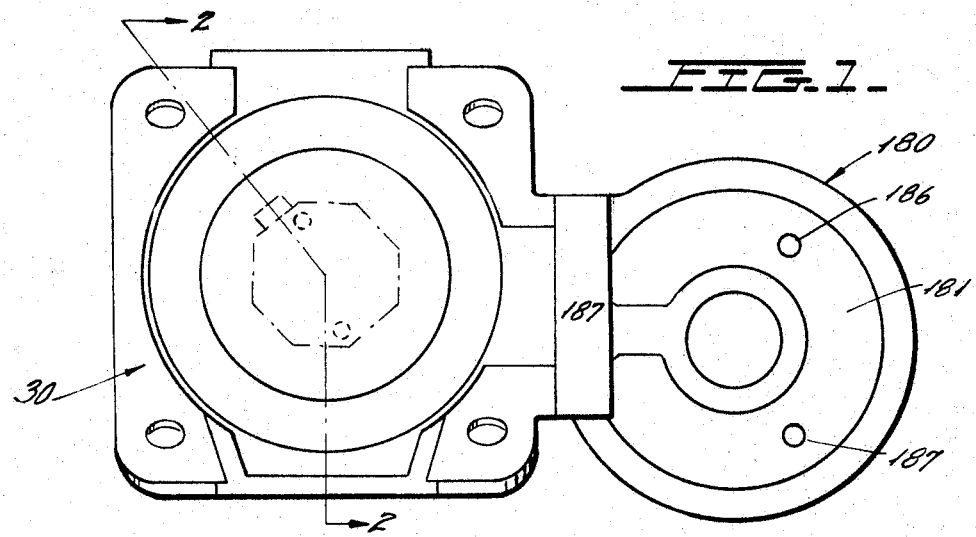
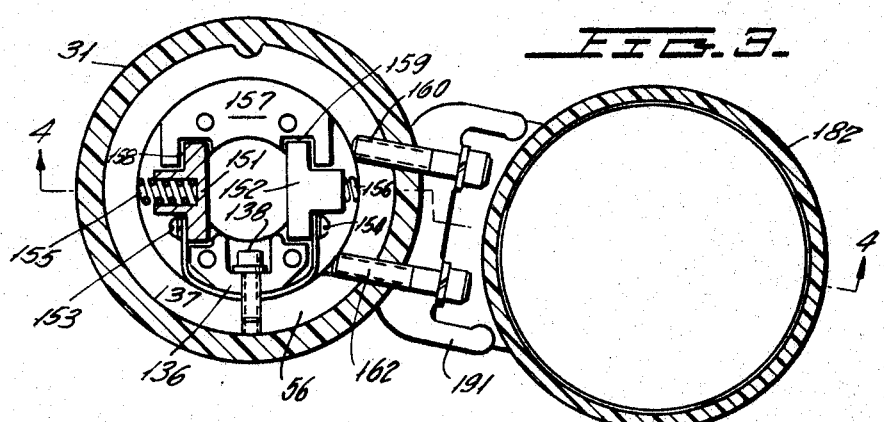
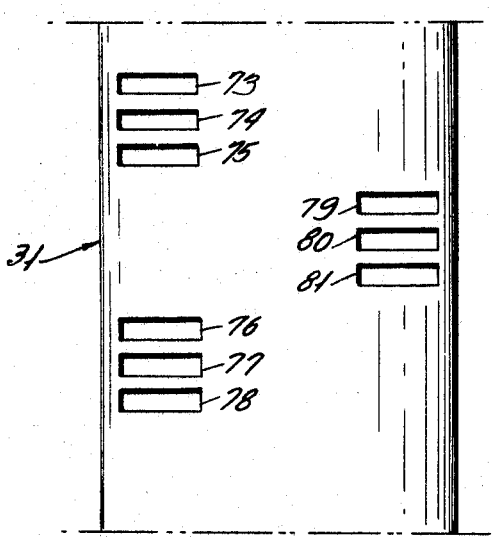
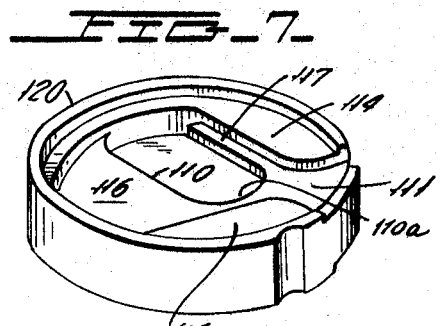
INVENTORS
EARL B. RIETZ
JAMES R. McCLOUD
HUBERT J. KOENN
DAVID A. WALL
BY
OSTROLENK, FABER, GERB & SOFFEN-ATTORNEYS July 9, 1968 E. B. RIETZ ET AL 3,392,248
INTERRUPTER STRUCTURE HAVING CONTOURED ARC SPLITTER
PLATES AND SEPARATELY HOUSED RESISTOR CONTACTS
AND RESISTOR STRUCTURE THEREFOR
Filed March 12, 1965 7 Sheets-Sheet 2

INVENTORS
EARL B. RIETZ
JAMES R. McCLOUD
HUBERT J. KOENN
DAVID A WALL
BY
OSTROLENK, FABER, GERB & SOFFEN
ATTORNEYS

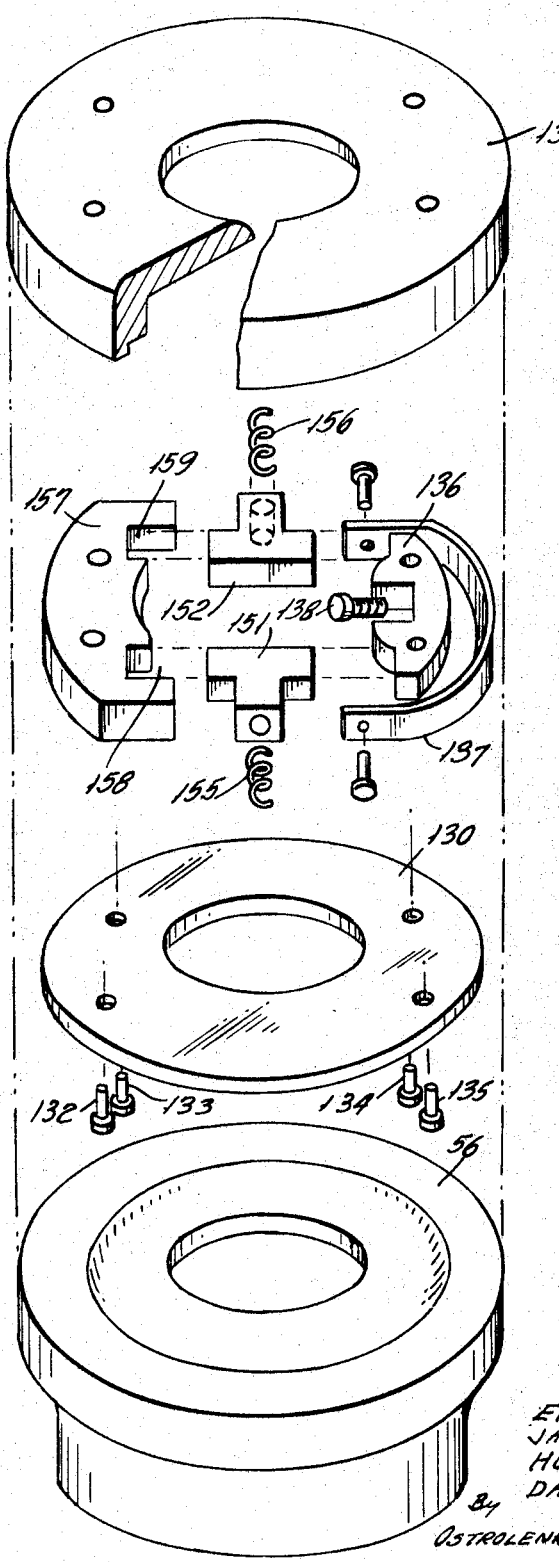

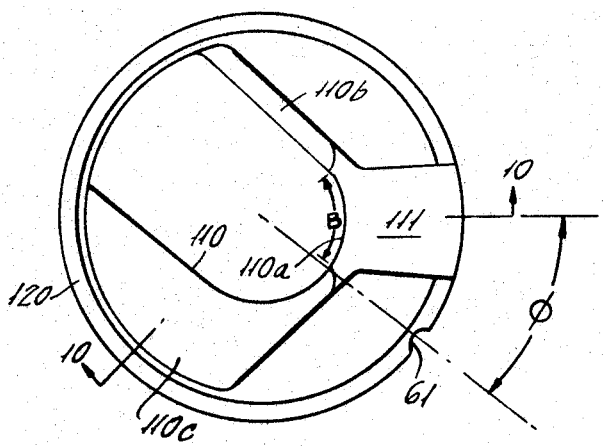
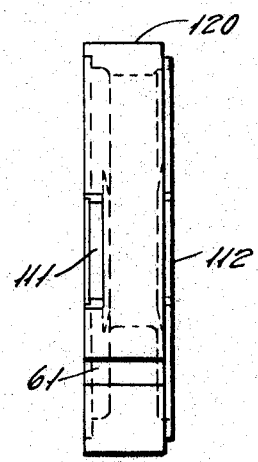
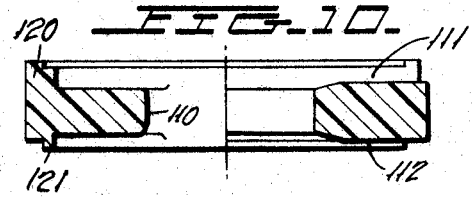
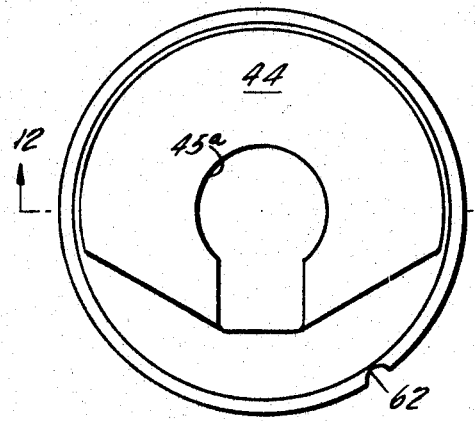
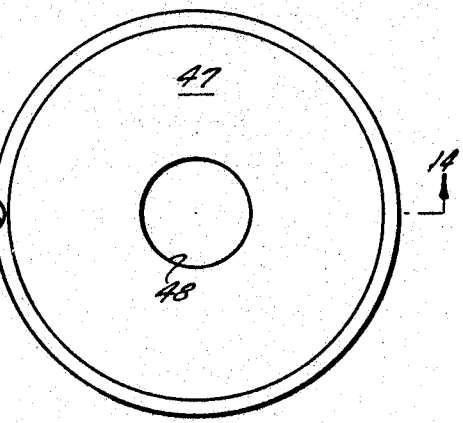
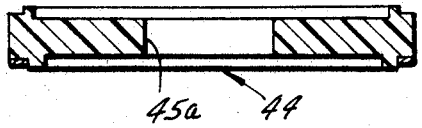
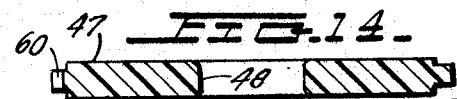

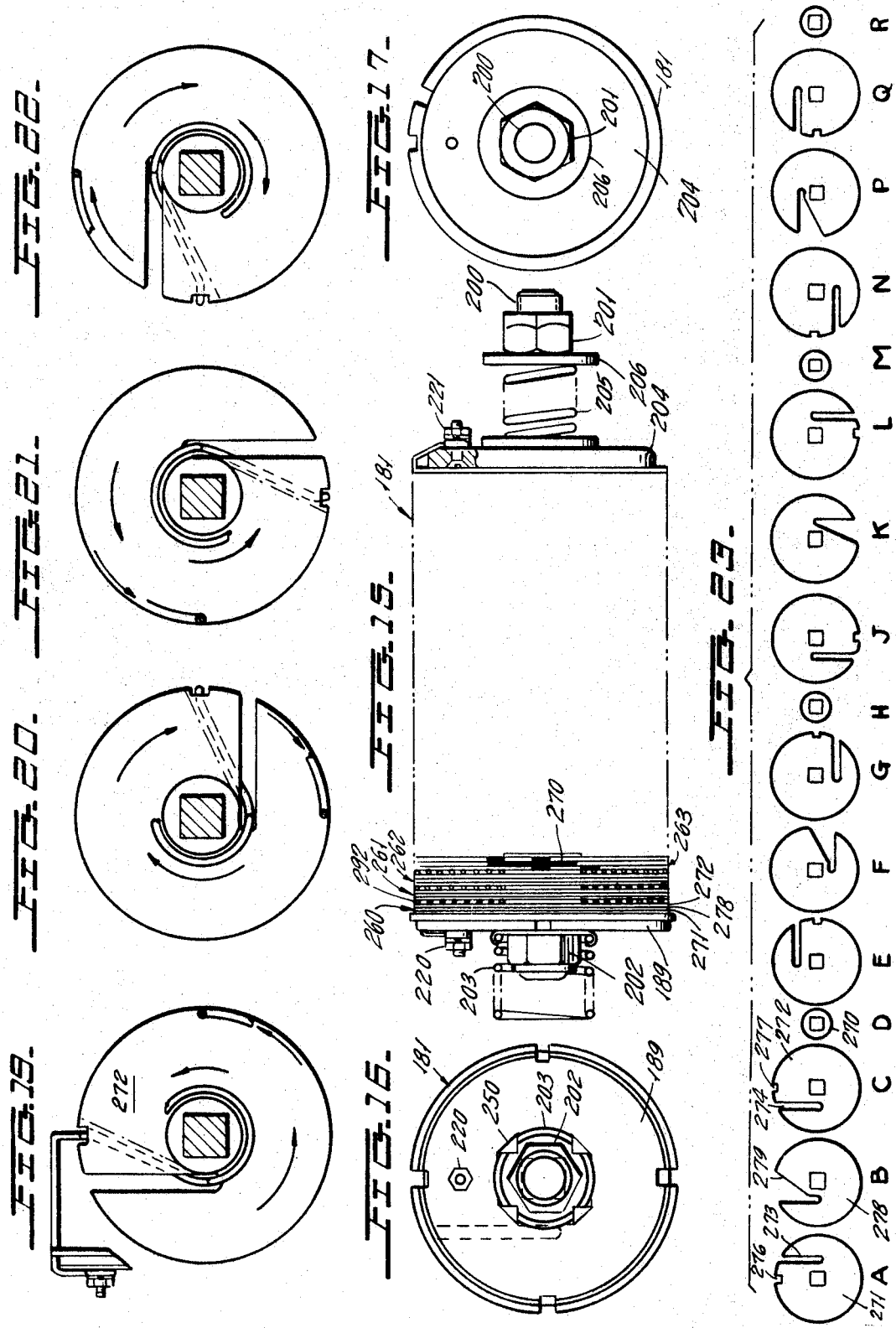

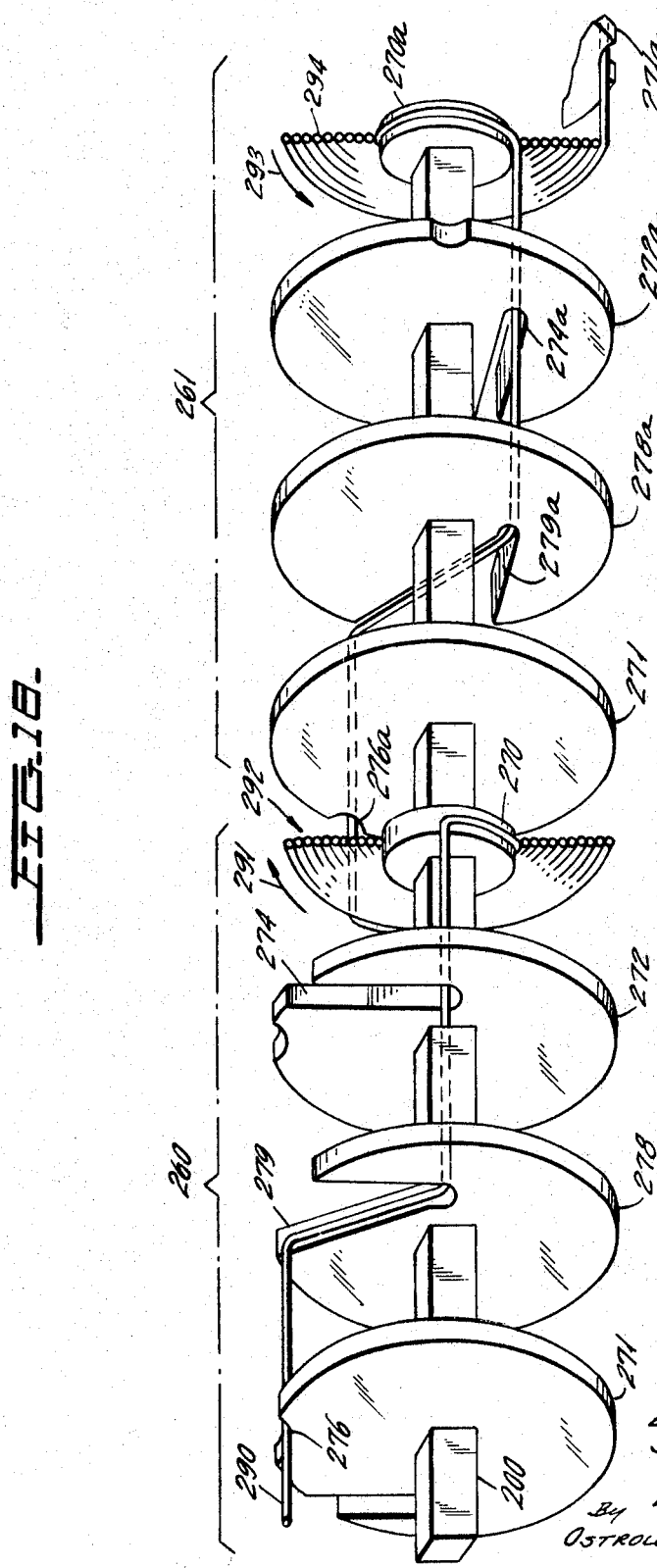

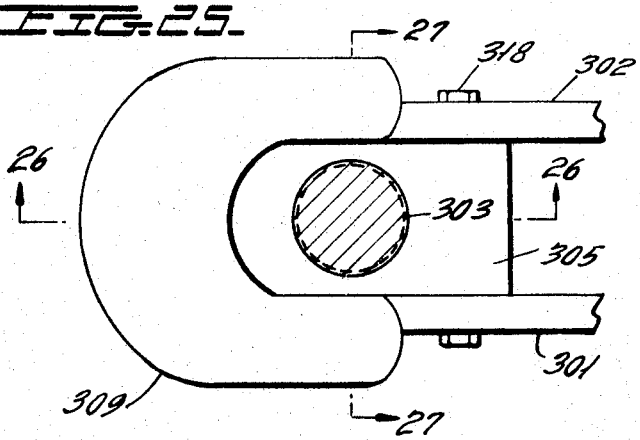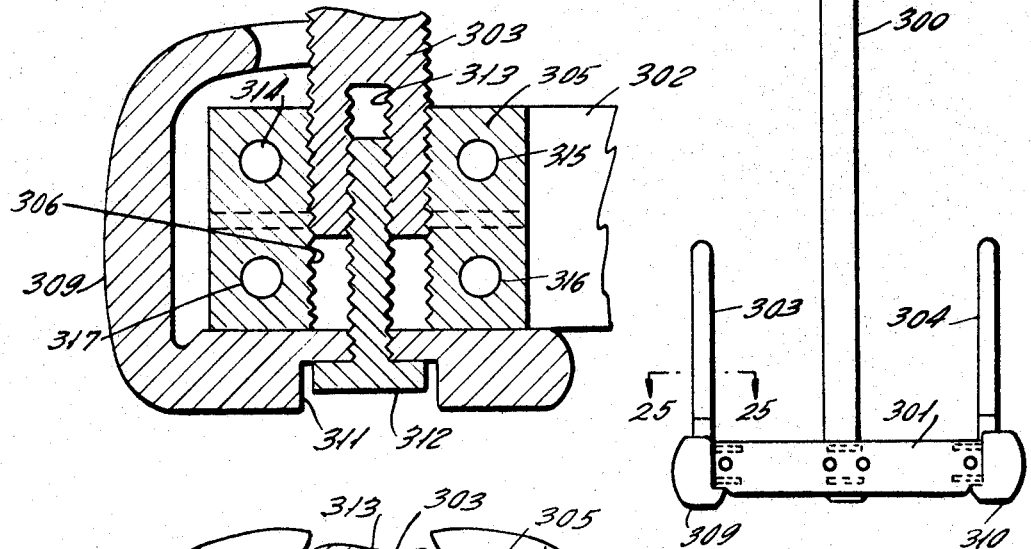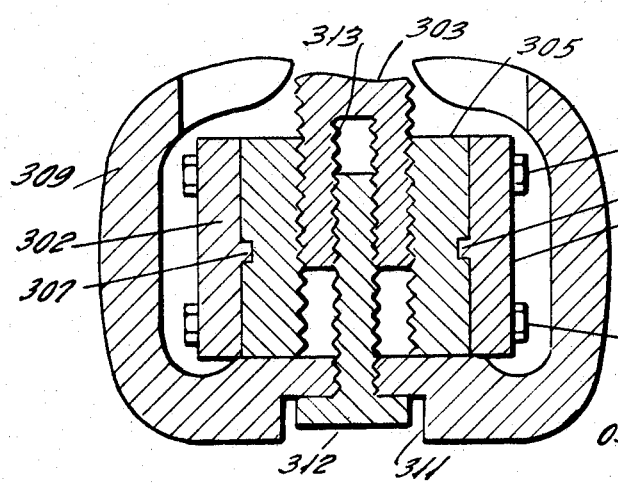

United States Patent Office 3,392,248
Patented July 9, 1968

3,392,248
INTERRUPTER STRUCTURE HAVING CONTOURED ARC SPLITTER PLATES AND SEPARATELY HOUSED RESISTOR CONTACTS AND RESISTOR STRUCTURE THEREFOR
Earl B. Rietz, La Canada, James R. McCloud, Burbank, Hubert J. Koenn, Alhambra, and David A. Wall, Pasadena, Calif., assignors to I-T-E Circuit Breaker Company, Philadelphia, Pa., a corporation of Pennsylvania
Filed Mar. 12, 1965, Ser. No. 439,304
13 Claims. (Cl. 200—150)

ABSTRACT OF THE DISCLOSURE

An oil circuit breaker interrupter comprised of a plurality of arc splitter plates clamped in an insulation tube having a bottom throat bushing which has a conductive coating therein. A bayonet contact reaches through aligned openings in the interrupter structure of a stationary contact structure to the top of the insulation tube. The arc splitter plates within the tube have elongated openings surrounded by a thinned-down section which leads to an opening in a rim of the plate which in turn communicates with a vent in the insulation tube. The resistor contact, which is self-contained between conductive plates, is clamped above the throat bushing and below the stack of arc splitter plates. A parallel resistor contained in its own housing is placed adjacent the insulation tube and is connected to the insulation tube by a casting.

---

This invention relates to oil circuit breakers, and more specifically relates to a novel interrupter structure including their parallel resistors for oil circuit breakers.

A first feature of the present invention is in the novel arrangement of the arc splitter plates of the interrupter.

Thus, an important object of the invention is to provide a novel splitter plate wherein the arc drawn within the interrupter is closely confined, and cannot move along the face of the splitter plate.

A further object of this invention is to provide a novel construction for arc splitter plates wherein sections thereof are reduced in thickness to provide shallow oil reservoirs in close proximity to the arc path.

Another object of this invention is to provide a novel arc splitter plate which has a peripheral ridge which prevents arc exhaust product escape from any direction other than toward the exhaust opening in the interrupter container.

Another object of this invention is to provide a novel port and baffle arrangement for the plates of the interrupter chamber of an oil circuit breaker.

As is well known to the art, it is often useful to provide an auxiliary impedance circuit in parallel with the main contacts of an oil circuit breaker interrupter. However, where such parallel connected impedances are used, it is necessary that when the main contacts are disengaged, the parallel path through the impedance elements be similarly disengaged.

A further important feature of the present invention provides a novel auxiliary contact arrangement whereby the parallel connected impedance circuit is opened when the main movable contact of the interrupter moves out of the interrupter chamber. More specifically, the present use of spring-tempered contact fingers mounted on the bottom lug of the interrupter tube and connected to one end of the impedance is avoided and replaced by a novel contact finger arrangement wherein separate contact fingers mounted in a novel manner are biased toward engagement with the contact rod. These contact fingers are then carried from a common conductive spring carrier which is, in turn, electrically connected to one end of the parallel connected impedance.

Accordingly, another important object of this invention is to provide an improved auxiliary contact arrangement for parallel connected impedances associated with interrupter structures.

Another object of this invention is to provide a novel auxiliary contact arrangement for interrupters which will not interfere with the normal function of the interrupter.

Yet another object of this invention is to provide a novel auxiliary contact arrangement which operates satisfactorily for long periods of time.

A still further object of this invention is to provide a novel auxiliary contact arrangement for interrupters wherein external connection to impedance elements may easily be made.

As indicated above, impedance elements connected in parallel with the main interrupter contacts operate to improve interruption characteristics. Such impedance elements are normally resistors.

Another important object of this invention is to provide a novel arrangement for these resistors wherein resistor coil layers are wound above one another and are clamped together by a central insulation rod.

Another object of this invention is to provide a novel pancake resistor arrangement which provides easily accessible electrical connections at each end thereof.

A further object of this invention is to provide a novel structural arrangement for a pancake resistor which permits heat expansion of the unit and prevents free entrance of carbon into the unit.

A still further object of this invention is to provide a novel pancake resistor structure which may be easily assembled.

In the performance of resistors for interrupter structures, it is preferable to use a non-inductive resistor. Such resistors are commonly formed by winding the layers of resistance wire in alternate directions.

It is a further important object of this invention to provide a novel structure for permitting the simplified manufacture of a non-inductive resistor having layers of resistance wire wound in alternate directions.

A further object of this invention is to provide a novel non-inductive resistance structure.

These and other objects of this invention will become apparent from the following description when taken in connection with the drawings, in which:

FIGURE 1 shows a top plan view of an interrupter structure and the housing for its parallel connected resistor.

FIGURE 3 is a cross-sectional view of FIGURE 2 taken across the lines 3—3 in FIGURE 2, particularly to illustrate the novel auxiliary resistor contacts.

FIGURE 5 is an exploded perspective diagram to particularly illustrate the novel auxiliary contact structure.

FIGURE 6 is a front plan view of the interrupter container of FIGURE 2, and particularly illustrates the placement of ports in the container.

FIGURE 7 is a perspective view of one of the novel splitter plates of the present invention.

FIGURE 8 is a top view of the plate of FIGURE 7.

FIGURE 9 is a front plan view of the plate of FIGURE 8.

FIGURE 10 is a cross-sectional view of the plate of FIGURE 8 taken across the lines 10—10 in FIGURE 8.

3

Figure 2:
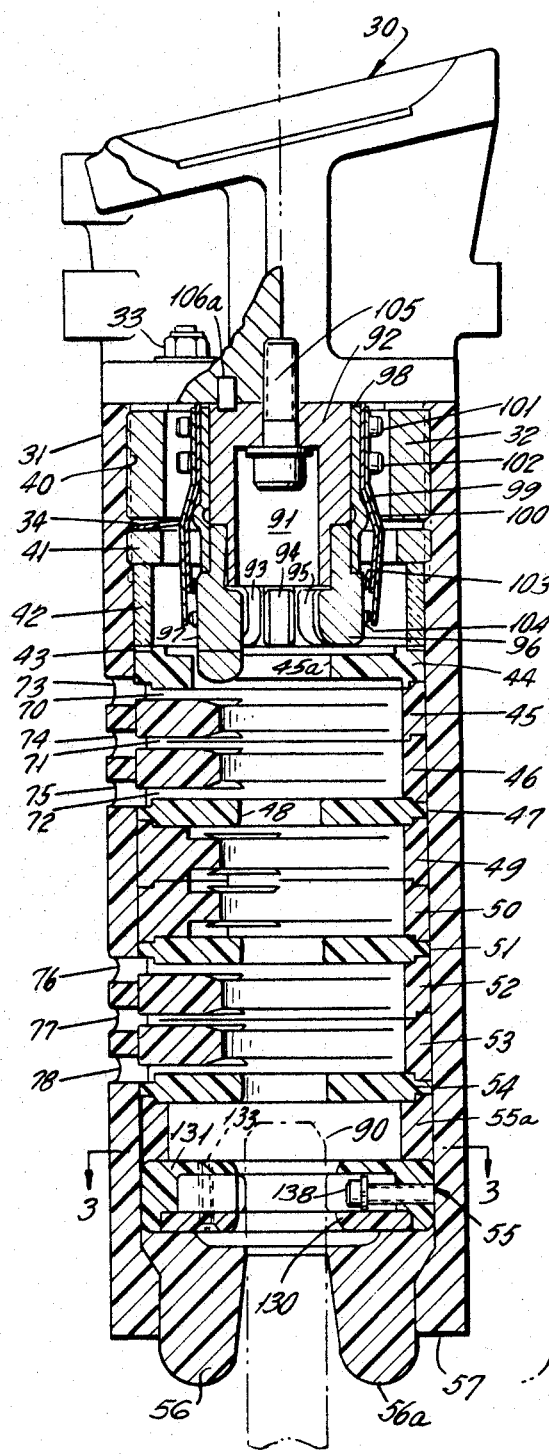
FIGURE 2 is a cross-sectional view of FIGURE 1 taken across the lines 2—2 in FIGURE 1.

FIGURE 11 is a bottom view of the top plate of FIGURE 2.

FIGURE 12 is a cross-sectional view of the plate of FIGURE 11 taken across the lines 12—12 in FIGURE 11.

FIGURE 13 is a top view of one of the interrupter plates of the interrupter of FIGURE 2.

FIGURE 14 is a cross-sectional view of FIGURE 13 taken across the lines 14—14 in FIGURE 13.

FIGURE 15 is a side view of the resistor structure to illustrate the manner in which resistor wire is non-inductively wound.

FIGURE 16 is a plan view of the resistor of FIGURE 15 seen from the left-hand side.

FIGURE 17 is a plan view of the resistor of FIGURE 15 seen from the right-hand side.

FIGURE 18 is an exploded perspective view schematically illustrating the manner in which the plates permit simple non-inductive winding of the resistance wire.

FIGURE 19 schematically illustrates the winding of the first layer of resistance wire.

FIGURE 20 schematically illustrates the winding of the second layer of resistance wire.

FIGURE 21 schematically illustrates the winding of the third layer of resistance wire.

FIGURE 22 schematically illustrates the winding of a fourth layer of resistance wire.

FIGURES 23a through 23r show 16 plates respectively in the order in which they are stacked for the novel resistor structure.

FIGURE 24 is an elevational view of the lift rod and cross-bar assembly carrying the elongated contact rods.

FIGURE 25 is a cross-sectional view of FIGURE 24 taken across the lines 25—25 in FIGURE 24.

FIGURE 26 is a cross-sectional view of FIGURE 25 taken across the lines 26—26 in FIGURE 25.

FIGURE 27 is a cross-sectional view of FIGURE 25 taken across the lines 27—27 in FIGURE 25.

Referring first to FIGURE 1 through 14, the novel interrupter chamber structure shall first be described.

As shown in FIGURES 1 and 2, the complete stucture will be supported from an upper conductive casting 30 which can be suitably secured to the end of an electrical bushing. This electrical bushing extends through the main support tank (not shown) which contains oil in which the complete interrupter structure is immersed.

The interrupter incldues an insulation casing 31 which is suitably connected to the casting 30. More specifically, a ring 32 is threadably received by internal threads on the interior of casing 31. A plurality of bolts, such as bolt 33 (FIGURE 2), then pass through openings in the flange of casting 30 and into threaded openings in ring 32.

An internal portion 40 of the upper end of tube 31 is threaded as illustrated, and receives pressure ring 41. A metal spring ring 34 electrically connects ring 40 and casting 30 to a pressure ring 41 to prevent corona noise from ring 41. The pressure ring 41, which is metallic, bears against an insulation spacer ring 42 which seats upon a gasket 43 contained around the periphery of the top spacer plate 44. The top plate 44 is shown in more detail in FIGURES 11 and 12, and it will be seen that this plate has a keyhole-shaped opening 45a therein. The plate 44 then bears against a splitter plate 45 which, in turn, bears against a splitter plate 46.

The splitter plate 45 is shown in more detail in FIGURES 7 through 10 and will be referred to more fully hereinafter. Note that splitter plates 45 and 46 are of the male-female variety insofar as the engagement of their outer peripheries are concerned, but are essentially identical to one another. The plate 46 then bears against a spacer plate 47 which is shown in more detail in FIGURES 13 and 14, and which has an opening 48 therein.

A second pair of plates 49 and 50, which are identical to plates 46 and 45 respectively, are then placed in position and a spacer plate 51, identical to plate 47, is immediately under plate 50. A third pair of plates 52 and 53, which are identical to plates 45 and 46, are then captured between plate 51 and a plate 54 which is identical to plates 47 and 51.

4

All of the plates 44 through 54 are of any suitable insulation material such as vulcanized fiber, or the like.

A spacer ring 55a is then positioned below plate 54 and is generally seated atop an auxiliary contact structure 55 which will be described more fully hereinafter, which is, in turn, captured by a throat bushing 56 which is contained within the lower restricted portion 57 of the tube 31.

The throat bushing 56, which is of a suitable insulation material, preferably has a conductive coating on the exterior surface thereof so that it will not be deteriorated by the occurrence of corona discharge over its surface.

It is to be understood that all of the plate elements are held together by means of the tightening of the spacer ring 41 which presses the elements against the bushing 56. Note that the elements are further keyed with respect to one another as by suitable keying notches such as notches 60 (plate 47, FIGURE 13), 61 (plate 45, FIGURE 8), and 62 (plate 44 of FIGURE 11) which cooperate with a key running along and extending from the interior of the tube 31.

It will be further noted that the pairs of splitter plates 45–46, 49–50 and 52–53 define channels which extend to exhaust ports in the tube 31. Thus, plates 45 and 46 define channels 70, 71 and 72 which are in communication with ports 73, 74 and 75 respectively in container 31. In a similar manner, the plates 52 and 53 define channels leading to ports 76, 77 and 78 respectively in tube 31.

The centrally disposed plates 49 and 50, as best seen in FIGURE 6, define channels similar, for example, to channels 70, 71 and 72 which lead to ports 79, 80 and 81 which are angularly displaced from the line of ports 73 through 78. This arrangement of displaced ports permits the direction of exhaust products during arc interruption toward areas of the tank which are the furthest removed from the walls of the tank. Moreover, it permits improved dispersion of the arcing products and of the reaction force of the arcing products on the interrupter structure.

The main contacts of the interrupter include a movable elongated rod-type contact schematically illustrated in dotted lines in FIGURE 2 as the rod contact 90. This contact is carried in the well-known manner on a conductive cross-bar, and passes through aligned openings in bushing 56 and the various plates within the interrupter to engage a circular cluster of stationary contact fingers in the stationary contact structure 91.

The stationary contact structure 91 is more specifically composed of a contact carrier 92 to which a plurality of contact fingers such as contact fingers 93, 94, 95 and 96 are secured. The contact carrier, or hub 92, further carries an elongated arcing contact finger 97 which extends lower than the remaining contact fingers and is the finger to which an arc is drawn when the movable contact 90 is withdrawn from the stationary contacts. Each of the contact fingers 93 through 97 are typically secured to the contact hub 92 as through a main flexible conductor 98 and a pair of biasing springs 99 and 100, all of which are connected to the contact hub 92 by suitable mounting bolts such as bolts 101 and 102. The ends of springs 99 and 100 bear on insulation buttons 103 and 106 respectively to prevent the formation of a current carrying path through the springs 99 and 100.

The contact hub 92 is then bolted directly to the member 30 as by a central bolt 105 with a keying member such as key 106a insuring proper alignment of contact hub 92 so that the arcing finger 97 is properly located within the casing 31. It will be seen that the elongated arcing finger 97 is positioned within the elongated portion of keyhole slot 45a in plate 44.

The operation of devices described to this point is as follows: When the movable contact 90 is withdrawn from the stationary contacts 91, an arc is drawn to arcing contact 97. This arc causes the decomposition of oil and generates high pressure within the interrupter. This causes the high speed movement of arcing products as well as fresh oil through the channels such as channels 70, 71 and 72, and out through the ports such as ports 73 through 81 (FIGURES 2 and 6); this stream of oil and arcing products passing through the arc, thus causing the extinction of the arc.

An important feature of the present invention lies in the formation of the arc splitter plates 45, 56, 49, 50, 52 and 53. More particularly, and as best shown in FIGURES 7, 8, 9 and 10, the plates have elongated U-shaped openings such as the opening 110 which acts as a large oil reservoir disposed immediately behind the working face 110a of the splitter and leads to restricted passages 111 on the one side of the plate and 112 (FIGURE 10) on the other side of the other side of the plate.

Regions such as regions 114 and 115 are thickened portions, while portions 116 and 117 are relatively thin compared to sections 114 and 115.

The U is disposed in line with the cross-phase axis of the breaker with the sides of the U closed-in to be parallel in order to be closely confining on the arc to prohibit sideway motion of the arc column.

Disposed on either side of this open reservoir 110 are volumes 110b and 110c formed between adjacent plates (either two adjacent plates of FIGURE 8 or one plate of either FIGURE 11 or 13). By thinning down the inward sections of the splitter plate (from the thickness required in the front or exhaust section as dictated by requirements of exhaust area and form), these secondary reservoir pockets are formed, disposed either side of and in close proximity to the intended arc position, along face 110a.

By thinning the splitter down at section 110c (FIGURE 8) to be less than at section 111 (FIGURE 8), the gap between adjacent faces is improved or made larger in areas away from the intended arc path than the gap across splitter-to-splitter in the intended arc path. This improves insulation withstand capability across the enlarged gaps. If the interrupter gap is going to fail to recover voltage following a current zero, it is thus more likely to fail across the minimum insulation gap and thus reestablish current in the region of the intended arc path.

The splitter plates, as shown in FIGURES 7 and 8, are fashioned with the exhaust port displaced from the cross-phase axis by an angle which is of the order of 40°. By stacking said splitters alternatively in the various positions in the overall baffle assembly within the interrupter tube, a divergent port assembly is achieved, as shown in FIGURE 6, in which ports 73, 74, and 75 are aligned in one position. Ports 79, 80, and 81 are displaced clockwise (viewed from top) with respect to them, and ports 76, 77, and 78 next adjacent vertically are displaced counterclockwise with respect to ports 79, 80, and 81. This resulting divergence serves to displace and divorce exhaust gases from adjacent interrupting sections to limit the possibility of electrical breakdown occurring outside the interrupter chamber from gas bubble to gas bubble of ionized gases; split the exhaust gases into smaller bubbles than with a single-in-line row of gases to permit more rapid cooling and dissipation of ionized arc products; direct exhaust gases to either side of the space between the interrupter and the oil tank in which insulation clearance in the oil is a minimum. Thus the divergent exhaust acts to retain greater integrity of insulation between live parts and the grounded steel tank during the interrupting process.

As a further important feature of the present splitter plate structure, it has been found that the arc will be more rigidly confined in position and will not move along the face of the splitter plates, as has been found in the past with other types of plate structures.

Finally, the plate is provided with peripheral ridges such as ridges 120 and 121 (FIGURE 10) which serve to prevent the escape of exhaust gases from regions other than the exhaust openings 111 and 112.

It will be noted that plates 45, 50 and 52 are identical to one another and differ from plates 46, 49 and 53 only in the arrangement of the peripheral edges. That is to say, they are arranged as male and female plates.

It is to be further noted that the keying notches in plate 49 and 50 will be angularly displaced from the keying notches in plates 45, 46, 52 and 53 so that the appropriate passages of plates 49 and 50 will be suitably aligned with the ports 79, 80 and 81 of FIGURE 6.

As previously indicated, it is often desirable to connect a suitable impedance in parallel with the main interrupter contacts (movable contact 90 and stationary contact 91) to improve the operation of the interrupter. It is, however, necessary to interrupt this auxiliary impedance circuit after interruption is accomplished at the main contacts.

The present invention provides a novel auxiliary contact arrangement which engages the movable contact rod 90 so long as the contact 90 is within the throat bushing, and is disengaged when the contact 90 leaves the throat bushing. This novel auxiliary contact arrangement is best shown in FIGURES 2, 3 and 5.

Referring now to these figures, it is seen that the throat bushing 56 has positioned thereon a metallic disk 130. The disk 130 is then secured to an upper cap 131 and is secured thereto by means of suitable screws such as screws 132, 133, 134 and 135. The plate 130 and cap 131 capture a stationary conductive block 136 which is seated upon a U-shaped conductive spring 137 and is secured to cap 131 by a bolt 138. The ends of spring 136 are then connected to the contact segments 151 and 152 respectively by suitable securing means such as screws 153 and 154 respectively. The contact segments 153 and 154 have a height less than the interior spacing between cap 131 and disk 130, and receive biasing springs such as compression springs 155 and 156 respectively which seat upon the interior of cap 131. Thus, the contact segments 151 and 152 are normally biased toward one another.

The total movement of contact segments 151 and 152 is restricted to predetermined limits by means of insert 157 which has movement-restricting notches 158 and 159 therein which receive portions of segments 151 and 152 respectively. Any suitable electrical connection is then made to the screw 138 or, for example, to the cap 131, this connection being taken externally of tube 31.

As will be seen more fully hereinafter, the mounting screws 160 and 161 for the resistor assembly, to be described, are threaded into tapped openings in cap 131, and thus form the lower terminal for the resistor which is connected in series with the auxiliary contacts 151 and 152.

In operation, it is clear that when the contact rod 90 of FIGURE 2 enters the interrupter structure, the segments 151 and 152 will be cammed outwardly against the force of their bushing springs 155 and 156 respectively so that good contact pressure is had between the contact rod 90 and contact segments 151 and 152. When the movable contact rod 90 is then moved to its disengaged position, and before contact 90 has cleared the bottom of the interrupter, any parallel connected impedance element connected to contacts 151 and 152 will be connected in parallel with the arc drawn between the main contacts.

Assuming now that the arc has been suitably extinguished and the contact rod 90 clears the bottom of the bushing 56, the contact 90 will disengage contact segments 151 and 152, thus opening the auxiliary circuit. Note that the contact segments 151 and 152 have only a limited permissible inward motion as determined, for example, by stops 158 and 159 so that the contacts do not collapse inwardly when the contact rod 90 is withdrawn.

It is to be specifically noted that the insulation spacer 55a which is carried above cap 131 of FIGURE 2 defines an oil reservoir above the resistor contacts 151 and 152. This novel oil reservoir decreases the chance of interrupting gases extending to the resistor contacts during the interruption operation. Moreover, it will be noted that the resistor contacts 151 and 152 are, in effect, completely encased in a metallic housing which includes plate 130 and cap 131 which each have rounded edges. This forms a uniform electrical field across the power gap and decreases corona and splitting of insulation member edges.

Figure 4:
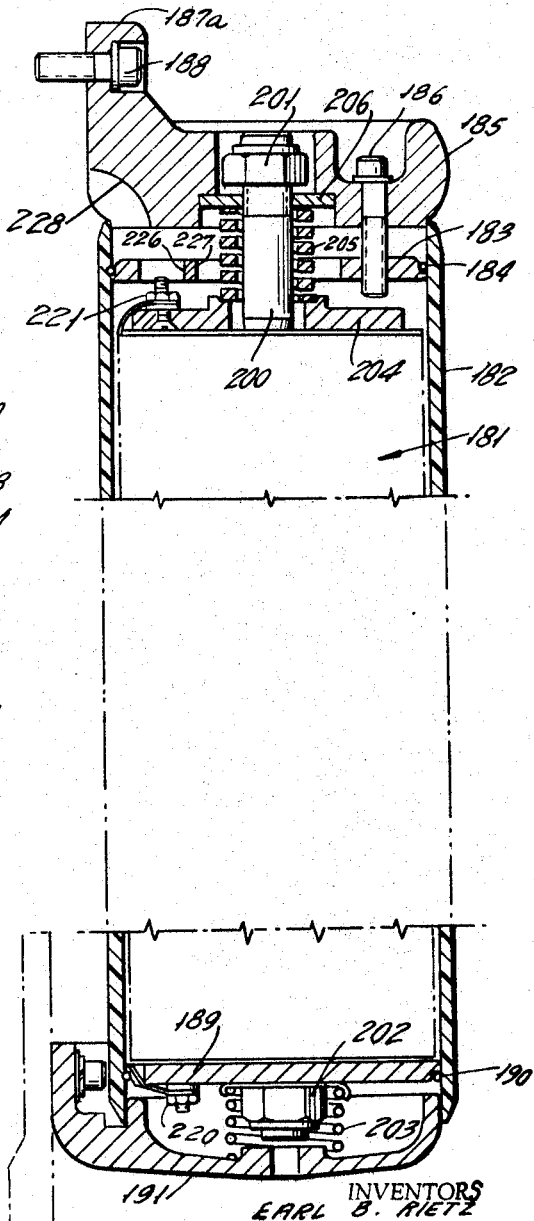
FIGURE 4 is a cross-sectional view of FIGURE 3 taken across the lines 4—4 in FIGURE 3, and particularly illustrates a novel resistor mounting structure of the invention.

FIGURES 1, 3 and 4 additionally show a novel resistor structure which can be used as the parallel connected impedance member for the interrupter of FIGURE 2. More specifically, a resistor structure generally shown by numeral 180 in FIGURE 1 is suitably secured to the interrupter structure of FIGURE 1 with the upper terminal of the resistor connected to member 30, and the lower terminal of the resistor connected to the resistor contacts 151 and 152.

This resistor structure is formed in the novel manner particularly shown in FIGURE 4, and includes a stack of resistor elements 181, which will be described more fully hereinafter, which are contained within an insulation tube 182. The tube 182 receives a plate 183 which may be metallic which is prevented from moving upwardly by means of a split interference ring 184 contained in a suitable groove in casing 182. An upper conductive housing or support 185 is then connected to plate 183 by suitable screws such as screws 186 and 187 (FIGURES 1 and 4). The upper housing section 185 has an upwardly extending flange section 187a (FIGURES 1 and 4) which receives bolts such as bolts 188 which serve to bolt the support member 185 directly to suitable portions of upper member 30 of the interrupter structure.

The lower portion of the resistor structure of FIGURE 4 includes a lower plate 189 which bears against the bottom of the resistor stack 181 and which is prevented from moving out of the tube by a suitable split interference ring 190. The bottom of casing 182 is then received by a suitable conductive support 191 which, as best shown in FIGURE 3, is secured to the bottom of the interrupter housing by screws 160 and 162 which further serve to electrically engage the resistor contacts 151 and 152.

In order to hold the resistor stack 181 together during assembly, a wooden rod or other suitable insulation rod 200 extends through the complete resistor housing and is terminated at either end by nuts 201 and 202 respectively. The plate 189 then seats atop a spring 203 which externally surrounds the lower end of rod 200 and its lower nut 202. At the upper portion of the structure, a pressure plate 204 bears atop stack 181 and receives a compression spring 205 which has its other end in engagement with the plate 206 which is carried within a suitable aperture in upper housing portion 185.

This novel structural arrangement permits the rod 200 to be in tension only during assembly of the device and removes any support function from the rod 200. The complete support for the resistor structure comes from the casing 182 and its upper and lower supports 185 and 191.

In order to assemble this novel structure, the resistor pack 181 is first inserted into the tube 182; the plate 183 and its interference ring 184 and the support 185 having been previously assembled in a loose manner by the screws 186. This permits the lower split interference ring 190 to be inserted into tube 182. The screws such as screw 186 are then tightened, which pulls the support 185 downwardly and into engagement with the upper end of tube 182. At the same time, spring 205 is compressed, and forces the resistor stack 181 downwardly until plate 189 engages interference ring 190.

Accordingly, the structural mounting, as indicated previously, completely relieves the wooden insulating rod 200 from the string mechanical forces, as would occur during a short circuit interruption operation.

The electrical circuit for the system partly extends from housing 191 which is appropriately connected to the terminal 220 through plate 189 and spring 203. Note that the terminal 220 could be connected to the resistor contacts 151 and 152 in any desired manner other than through the housing section 191.

The upper end of the resistor pack terminates in terminal 221 which, by making plate 204 of metallic material, is electrically connected through spring 205 and metallic plate 206 to the metallic upper housing 185 and thence to the upper conductive housing 30 of the interrupter.

In order to permit oil circulation through the resistor structure, bottom slots such as slot 225 are provided in the lower plate 189 and through openings 226, 227 and 228. Note that the uppermost opening 228 is so arranged in the side of upper housing 185 that carbon and other similar impurities floating in the circuit breaker oil will not easily settle into the resistor structure.

The main purpose of nut 201 is to hold the resistor pack together when it is removed from the tube 181. Thus, the complete resistor pack, along with plates 189, 204, 183 and 206, serve as a subassembly of the resistor structure.

It is to be particularly noted that prior art resistor devices utilize the central rod 200 as the main structural member for carrying the resistor structure from the interrupter. Thus, the rod necessarily becomes very large which, in turn, enlarges the complete unit.

The manner in which the resistor package 181 is formed is particularly shown in FIGURES 15 through 22. The assembly of the resistor of FIGURES 15 through 22 will be recognized as the resistor structure removed from its housing 182 in FIGURE 4. Note particularly that the spring 203 is captured by lower nut 202 by means of a square sheet 250 of FIGURES 15 and 16 whose corners are folded over, as shown in FIGURE 16, to capture spring 203.

It is extremely desirable that the resistor used as the parallel impedance for the interrupter of the invention or of other similar interrupter equipment be of a non-inductive nature. Non-inductive resistors are generally well known, and are formed by winding a resistance wire in several layers with alternate layers, for example, being wound in opposite directions. In this manner, the magnetic fields induced in adjacent layers oppose one another so that the inductance of the coil is negligibly small.

Present arrangements for achieving the opposite winding direction for alternate layers of resistance wire are extremely awkward, time consuming, and the wire cannot be wound directly from a wire spool. The novel resistor structure shown in FIGURES 15 through 22 is one in which a non-inductive resistor can be wound directly from a wire spool with the coils or adjacent layers being suitably separated to keep creep voltage stress for between-layer cross-overs below a safe maximum value.

In accordance with the invention, each layer of resistance wire is associated with a set of spacers and plates wherein the spacers and plates have suitable notches therein for permitting placement and winding reversal of the resistor wire which is wound from a single spool. Moreover, the spacers and plates for adjacent layers are 90° displaced from one another which permits a similar displacement at the between-layer cross-over to keep voltage creep stresses to a minimum.

In FIGURES 15 and 19 through 23, We have illustrated the formation of the first four layers of the resistor, it being understood that the complete resistor will be formed in an identical manner.

Referring now to FIGURE 15, there is shown four groups 260, 261, 262 and 263 respectively of three plates and a winding plate each. The groups 260 through 263 are shown in FIGURES 19 through 22 respectively. Each of the stacks 260 through 263 are formed of plates, best shown in FIGURE 18 for the case of stacks 260 and 261 in exploded perspective view.

The individual plates of stacks 260 through 263 are further shown in FIGURES 23a through 23r, which are in the order in which the plates are stacked. Each of the plates are mounted on the square wooden shaft 200. The group of plates 260 is shown in FIGURES 23a, b, c and d, and includes a winding plate 270, first and second slotted plates 271 and 272, which are identical in construction and contain narrow slots 273 and 274 respectively, and notches 276 and 277 respectively, and a central plate 278 which contains a V-shaped notch 279.

Each of the remaining groups are made up of similar plates to those shown in FIGURES 23a, b, c and d, but are rotated clockwise by 90° with respect to the plates of an adjacent group. This feature permits applicants' novel displaced cross-over point in the resistance winding.

The method of winding the non-inductive resistor of the invention when using plates of the type shown in FIGURES 15 through 23 is best understood from FIGURE 18 for the case of the first two groups 260 and 261.

Referring particularly to FIGURE 18, the resistance wire 290 is taken from some suitable spool, not shown. The various plates such as plates 271, 278, 272 and 270 are then contained on the square wooden shaft 200 and the resistance wire 290 is placed in the groove 276 of plate 271. This wire is then brought to the top of the sloping portion of V-shaped slot 279 and then rides down to the slot to the bottom thereof. At this point, the wire extends over to the bottom of the narrow slot 274 and thence to the top surface of the winding plate or disk 270. The wooden shaft 200 is then rotated so that the resistance wire winds on plate 270 in the direction shown by the arrow 291. Some predetermined number of turns are then formed on the plate 270 to form a pancake-type resistance winding 292.

The next group of plates 261 have been assembled and are rotated by 90° with respect to the similar stack of plates 270. The end of pancake winding 292 is taken from a point to the rear of the winding in FIGURE 18, and is bent directly over into the notch 276 of plate 271 of group 261.

In a manner identical to that for group 260, the wire then enters the V-shaped slot 279a of plate 278a to the bottom of the slot and then over through the bottom of slot 274a of plate 272a. Thereafter, the wire is placed immediately on the winding surface of plate 270a and the assembly is rotated in such a direction that a pancake resistance winding 293 is formed with the wire winding in the direction of the arrow 294. Note that winding 293 is wound oppositely to winding 292, whereby the magnetic fields generated by each of the windings when current flow passes therethrough are in opposing directions, thus rendering these two winding sections relatively non-inductive.

Clearly, this winding process continues until the end of the resistor is reached with the adjacent windings being wound oppositely from one another. Moreover, the points at which each of the windings terminates and crosses over to the next group of plates are displaced with respect to one another my 90°, thereby improving the voltage distribution across the winding.

As a further feature of the present invention, a novel method of securing the elongated movable contacts to the cross bars has been provided. This novel arrangement is best shown in FIGURES 24 through 27, where FIGURE 24 shows an elevational view of the common lift rod 300 which is secured to a pair of conductive cross bars 301 and 302. The cross bars 301 and 302 then carry the elongated movable contacts, such as movable contacts 303 and 304 at their outer ends. Contacts 303 and 304 cooperate with a pair of interrupter structures each of which are of the type described above.

In accordance with the invention, the contacts, such as contact 303, are secured to the cross bars 301 and 302 in a novel manner best shown for contact 303 in FIGURES 25, 26 and 27. Thus, a conductive block 305 is provided which has a threaded opening 306 therein which receives the lower threaded end of contact 303, as best shown in FIGURES 26 and 27. The contact block 305 is further provided with keying indentations along the sides thereof which receive keying projections 307 and 308 (FIGURE 27) in cross bars 302 and 301 respectively.

A corona shield, such as corona shield 309, then surrounds ends of cross bars 301 and 302, while a second corona shield 310 (FIGURE 24) surrounds the other end of cross bars 301 and 302. The corona shields then have an opening 311 (FIGURES 26 and 27) which receives a bolt 312 which is threaded into a threaded opening 313 at the bottom of contacts 303. A conductive block 305 is then rigidly secured to cross bars 301 and 302 by four bolts which pass through openings 314, 315, 316 and 317 of FIGURE 26. Thus, in FIGURE 25 the bolt 318 passes through opening 315 of FIGURE 26. Similarly, the bolt 319 of FIGURE 27 passes through opening 316 in FIGURE 26.

In order to assemble the device of FIGURES 24 through 27, it will now be apparent that the contact block 305 is received through keys 307 and 308 by the cross bars 301 and 302. Thereafter, the block 305 may be bolted to the cross bars 301 and 302 by the bolt arrangement previously described. Thereafter, the elongated contacts, such as contact 303, is screwed into block 305 until it has some predetermined height above the block. The end corona shields are then placed in position to surround the ends of the cross bars and the bolt 312 is then threaded into the opening 313 to lock the contact 303 into position and to secure the corona shield, such as shield 309 in position.

Although this invention has been described with respect to its preferred embodiments, many variations and modifications will now be obvious to those skilled in the art, and it is preferred, therefore, that the scope of the invention be limited not by the specific disclosure herein but only by the appended claims.

The embodiments of the invention in which an exclusive privilege or property is claimed are defined as follows:

1. In an interrupter structure for an oil circuit breaker; a plurality of plates of insulation material stacked and retained within an insulation tube; said insulation tube having a plurality of vents therein; said insulation tube having a stationary contact means and a plate clamping means at one end thereof; said insulation tube having a throat bushing at the other end thereof; said plates being compressed within said insulation tube between said plate clamping means and said throat bushing means; each of said plates having aligned openings for passage of an elongated, axially movable contact; said plurality of plates including a first and second spacer plate and a first and second arc splitter plate; said first and second arc splitter plates having first surfaces positioned adjacent one another; said first and second spacer plates being positioned adjacent the opposite surfaces of said first and second arc splitter plates; said first surfaces of said arc splitter plates defining a first enclosed channel from their said opening to one of said plurality of vents; said opposite surfaces of said arc splitter plates along with said first and second spacer plates defining second and third enclosed channels respectively leading from said opening to respective second and third ports of said plurality of ports; said second and third ports being respectively above and below said first port; at least said first arc splitter plate having a peripheral rim of uniform thickness extending above its said first surface; said peripheral rim having an opening therein to define said first channel; said first surface of said first arc splitter plate having a depressed region therein extending laterally from said opening in said rim to said opening in said first arc splitter plate to define thickened sections of said first arc splitter plate running along the sides of said first channel; said opening in said first arc splitter plate being elongated in a direction away from said opening in said rim.

2. The device substantially as set forth in claim 1 wherein said opening is substantially surrounded by a relatively thin plate section; said relatively thin plate section having first and second thickness portions extending toward said rim and defining a thin region path extending to said opening in said rim.

3. The device substantially as set forth in claim 1 wherein said second arc splitter plate is constructed in a manner substantially identical to said first arc splitter plate; said opening in said rim of said second plate defining said second channel.

4. The device substantially as set forth in claim 2 wherein said second arc splitter plate is constructed in a manner substantially identical to said first arc splitter plate; said opening in said rim of said second plate defining said second channel.

5. An arc splitter plate for an oil circuit breaker comprising a circular plate of insulation material having a central opening therethrough; a peripheral rim of uniform thickness extending above one surface of said plate; an opening in said rim extending to the level of said surface; said central opening being elongated in a direction away from said opening in said rim; and a depression in said one surface extending laterally from said opening defining a relatively thin plate section surrounding said opening; said relatively thin plate section having first and second thickness portions extending toward said rim and defining a thin region path extending to said opening in said rim.

6. In an interrupter structure for an oil circuit breaker; a plurality of plates of insulation material stacked and retained within an insulation tube; said insulation tube having a plurality of vents therein; said insulation tube having a stationary contact means and a plate clamping means at one end thereof; said insulation tube having a throat bushing at the other end thereof; said plates being compressed within said insulation tube between said plate clamping means and said throat bushing means; each of said plates having aligned openings for passage of an elongated, axially movable contact; an auxiliary contact assembly; said auxiliary contact assembly being clamped between the opposing surfaces of said throat bushing and the end of said stacked plates; said auxiliary contact assembly including an annular conductive support structure and a plurality of contacts positioned within the interior of said conductive support structure; said annular conductive support structure defining a central opening which is coaxial with said openings in said plates; a biasing means for said plurality of contacts; said biasing means biasing said contacts toward the center of said central opennig; said conductive support including a first and second conductive disk; said first disk having a rim extending from the outer periphery thereof; and clamping means for clamping said rim of said first disk to the outer periphery of said second disk; the annular space between the opposing surfaces of said first and second disks receiving said plurality of contacts.

7. The device substantially as set forth in claim 6 wherein said plurality of contacts include at least a first and second movable contact, and a stop means for limiting the motion of said first and second contacts; and conductive spring means having its opposite ends connected to said first and second contacts respectively; said conductive spring means being contained within the inner periphery of said conductive support and being mechanically connected thereto; said spring means mechanically retaining said contacts within said conductive support and electrically connecting said contacts to one another.

8. In an interrupter structure for an oil circuit breaker; a plurality of plates of insulation material stacked and retained within an insulation tube; said insulation tube having a plurality of vents therein; said insulation tube having a stationary contact means and a plate clamping means at one end thereof; said insulation tube having a throat bushing at the other end thereof; said plates being compressed within said insulation tube between said plate clamping means and said throat bushing means; each of said plates having aligned openings for passage of an elongated, axially movable contact; and an auxiliary contact structure at the bottom of said interrupter tube; a resistor assembly having a first and second terminal electrically connected to said stationary contact structure and said auxiliary structure respectively; said resistor assembly including a resistor tube, a plurality of stacked resistor disks connected in series with one another within said tube and to said first and second terminals, an upper and lower compression plate on the upper and lower surfaces of said stacked resistor disks, and an upper and lower conductive support received by the upper and lower ends respectively of said tube, and a central rod extending through said disks and said upper and lower compression plates; said central rod being connected to said upper and lower compression plates and forcing them toward one another to hold said resistor disks together; said upper and lower conductive supports having mounting means therein for mounting said resistor assembly with respect to said interrupter tube; said central rod being independent of a mounting function.

9. The device substantially as set forth in claim 8 which includes a compression spring adjacent one of said upper or lower compression plates; said one of said upper or lower compression plates being connected to one end of said central rod through said compression spring, the other of said upper or lower compression plates being directly secured to the other end of said central rod.

10. The device substantially as set forth in claim 8 wherein said upper conductive support structure has a passage therethrough for circulation of oil into and out of said resistor tube.

11. The device substantially as set forth in claim 8 wherein said lower compression plate is captured in the lower end of said resistor tube by snap ring means in the interior of said resistor tube.

12. The device substantially as set forth in claim 8 which further includes a second upper compression plate spaced from said upper compression plate; said second upper compression plate being directly secured to said upper conductive support; said second upper compression plate being captured by snap ring means in the upper end of said resistor tube.

13. The device substantially as set forth in claim 11 which further includes a second upper compression plate spaced from said upper compression plate; said second upper compression plate being directly secured to said upper conductive support; said second upper compression plate being captured by snap ring means in the upper end of said resistor tube.

References Cited

UNITED STATES PATENTS

| | | | |
|---|---|---|---|
| 1,955,213 | 4/1934 | Whitney et al. | 200—150 |
| 2,467,542 | 4/1949 | Taylor | 200—150 |
| 2,714,645 | 8/1955 | Salzer | 200—150 |
| 3,128,360 | 4/1964 | Rietz | 200—150 |
| 3,267,242 | 8/1966 | McConnell | 200—150 |
| 3,313,901 | 4/1967 | McCloud et al. | 200—150 |

FOREIGN PATENTS

| | | |
|---|---|---|
| 1,107,013 | 7/1955 | France. |
| 869,654 | 6/1961 | Great Britain. |

ROBERT S. MACON, *Primary Examiner.*